US010681230B2

(12) United States Patent
Shibata

(10) Patent No.: US 10,681,230 B2
(45) Date of Patent: Jun. 9, 2020

(54) INFORMATION PROCESSING APPARATUS, METHOD OF PROCESSING INFORMATION, AND STORAGE MEDIUM

(71) Applicant: Yuto Shibata, Kanagawa (JP)

(72) Inventor: Yuto Shibata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/423,406

(22) Filed: May 28, 2019

(65) Prior Publication Data

US 2019/0281175 A1 Sep. 12, 2019

Related U.S. Application Data

(63) Continuation of application No. 15/785,463, filed on Oct. 17, 2017, now Pat. No. 10,348,915.

(30) Foreign Application Priority Data

Oct. 28, 2016 (JP) ................................ 2016-211541

(51) Int. Cl.
H04N 1/00 (2006.01)
H04N 1/32 (2006.01)

(52) U.S. Cl.
CPC ....... H04N 1/00503 (2013.01); H04N 1/0097 (2013.01); H04N 1/00411 (2013.01); H04N 1/00482 (2013.01); H04N 1/00506 (2013.01); H04N 1/32657 (2013.01); H04N 2201/0089 (2013.01); H04N 2201/0094 (2013.01); H04N 2201/0098 (2013.01)

(58) Field of Classification Search
None
See application file for complete search history.

(56) References Cited

U.S. PATENT DOCUMENTS

| 2008/0141148 | A1 | 6/2008 | Ogita |
| 2013/0088737 | A1 | 4/2013 | Iwasa et al. |
| 2014/0082544 | A1* | 3/2014 | Umeizumi ......... H04N 1/00411 715/772 |
| 2015/0073935 | A1 | 3/2015 | Shibata et al. |

(Continued)

FOREIGN PATENT DOCUMENTS

JP 2008-167417 7/2008

Primary Examiner — Frantz Bataille
(74) Attorney, Agent, or Firm — Oblon, McClelland, Maier & Neustadt, L.L.P.

(57) ABSTRACT

An information processing apparatus includes a memory to store information of a display status of setting item buttons used for selecting corresponding setting items on a screen, and information of at least one of the setting items corresponding to an error that occurs during information processing as an error-occurred setting item, and circuitry to detect occurrence of the error during the information processing, determine whether a setting item button corresponding to the error-occurred setting item is displayed or not on the screen when the occurrence of the error is detected during the information processing, and display the setting item button corresponding to the error-occurred setting item on the screen based on a determination that the setting item button corresponding to the error-occurred setting item is not displayed on the screen when the occurrence of the error is detected during the information processing.

15 Claims, 17 Drawing Sheets

(56) References Cited

U.S. PATENT DOCUMENTS

| | | | |
|---|---|---|---|
| 2015/0077777 A1* | 3/2015 | Hayakawa | H04N 1/00472 |
| | | | 358/1.13 |
| 2015/0339548 A1 | 11/2015 | Kitayama et al. | |
| 2016/0072977 A1 | 3/2016 | Sasayama et al. | |
| 2016/0150123 A1 | 5/2016 | Okada et al. | |
| 2016/0155093 A1 | 6/2016 | Shibata et al. | |
| 2016/0216975 A1* | 7/2016 | Hashimoto | G06F 9/4818 |
| 2017/0085731 A1 | 3/2017 | Akuzawa | |
| 2017/0163826 A1 | 6/2017 | Nakazawa et al. | |

* cited by examiner

SETTING ITEM TABLE

| SETTING-ITEM ID | NAME | POSITION | DISPLAY |
|---|---|---|---|
| 01 | MONOCHROME/COLOR | 1 | Y |
| 02 | MAGNIFICATION | 2 | Y |
| 03 | NUMBER OF COPIES | 3 | Y |
| 04 | DENSITY | 4 | Y |
| 05 | TRAY | 5, 6 | Y |
| 06 | STAPLE | 7 | Y |
| 07 | PUNCH | 8 | Y |
| 08 | SORT | 9 | Y |
| 09 | DOUBLE/SINGLE FACE | - | Y |
| ... | ... | ... | ... |

FIG. 9

ERROR TABLE

| ERROR ID | ERROR MESSAGE | SETTING-ITEM ID |
|---|---|---|
| E01 | THIS SHEET CANNOT BE PUNCHED. RESELECT SHEET OR CANCEL PUNCH. | 05, 07 |
| E02 | TONER (COLOR) IS INSUFFICIENT. EXCHANGE CARTRIDGE OR PRINT IN MONOCHROME | 01 |
| E03 | ALL TRAYS ARE SET FOR SINGLE-SIDED COPY. DOUBLE-SIDED COPY CANNOT BE USED. CANCEL DOUBLE-SIDED COPY. | 09 |
| E04 | SELECT SHEET | 05 |
| ... | ... | ... |

FIG. 10

OPTION TABLE

| OPTION ID | SETTING-ITEM ID | NAME | SELECTION |
|---|---|---|---|
| 01 | 08 | NONE | N |
| 02 | 08 | SORT | N |
| 03 | 08 | SORT BY ROTATION | N |
| 04 | 09 | DOUBLE FACE | Y |
| 05 | 09 | SINGLE FACE | N |
| ... | ... | ... | ... |

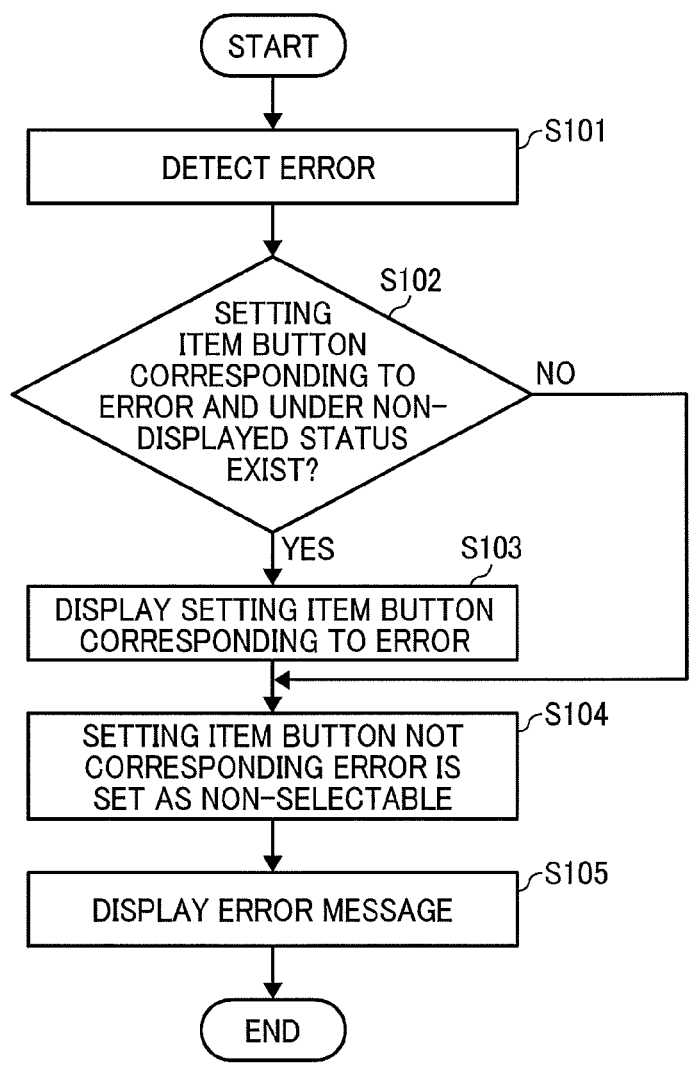

INFORMATION PROCESSING APPARATUS, METHOD OF PROCESSING INFORMATION, AND STORAGE MEDIUM

CROSS-REFERENCE TO RELATED APPLICATION

This application is a continuation Application of U.S. application Ser. No. 15/785,463, filed Oct. 17, 2017, which is a claims priority pursuant to 35 U.S.C. § 119(a) to Japanese Patent Application No. 2016-211541 filed on Oct. 28, 2016 in the Japan Patent Office. The entire contents of the above-identified applications are incorporated herein by reference.

BACKGROUND

Technical Field

This disclosure relates to an information processing apparatus, a method of processing information, and a storage medium.

Background Art

Multi-functional peripherals (MFPs) employing an operation panel including a touch panel have been widely used. The operation panel displays a screen displaying setting items to be selected by a user. For example, the screen displays setting buttons corresponding to respective setting items. When the user selects one setting button, a screen for selecting a setting value of one setting item corresponding to the selected one setting button is displayed, and then the setting value can be selected.

In recent years, the number of functions of MFP has been increased, and thereby setting items that can be set by the user has been increased. Therefore, when setting buttons corresponding to all of the setting items are displayed on a screen, operability of the MFP may decrease because the user may feel difficulty in finding desired setting buttons. Therefore, MFPs that the user can customize display status of setting buttons have been proposed. In this MFP, the user can display the desired setting buttons, with which the number of the setting buttons displayed on the screen can be reduced, with which the operability of the MFP can be improved.

However, in this MFP, if an error occurs while executing a job, one or more setting buttons necessary for cancelling the error may not be displayed on the screen. If the setting buttons necessary for cancelling the error are not displayed on the screen, the error cannot be canceled, and thereby the apparatus cannot return to a normal operation from the error.

SUMMARY

As one aspect of the present invention, an information processing apparatus is devised. The information processing apparatus includes a memory to store information of a display status of one or more setting item buttons used for selecting corresponding one or more setting items on a screen, the one or more setting items to be applied to information processing, and information of at least one of the one or more setting items corresponding to an error that occurs during the information processing as an error-occurred setting item, and circuitry to detect occurrence of the error during the information processing, determine whether a setting item button corresponding to the error-occurred setting item is displayed or not on the screen when the occurrence of the error is detected during the information processing, and display the setting item button corresponding to the error-occurred setting item on the screen based on a determination that the setting item button corresponding to the error-occurred setting item is not displayed on the screen when the occurrence of the error is detected during the information processing.

As another aspect of the present invention, a method of processing information is devised. The method includes storing, in a memory, information of a display status of one or more setting item buttons used for selecting corresponding one or more setting items on a screen, the one or more setting items to be applied to information processing, and information of at least one of the one or more setting items corresponding to an error that occurs during the information processing as an error-occurred setting item, detecting occurrence of the error during the information processing, determining whether a setting item button corresponding to the error-occurred setting item is displayed or not on the screen when the detecting step detects the occurrence of the error during the information processing, and displaying the setting item button corresponding to the error-occurred setting item on the screen based on a determination that the setting item button corresponding to the error-occurred setting item is not displayed on the screen when the detecting step detects the occurrence of the error during the information processing.

As another aspect of the present invention, a non-transitory storage medium storing one or more instructions that, when executed by one or more processors, cause the one or more processors to execute a method of processing information is devised. The method includes storing, in a memory, information of a display status of one or more setting item buttons used for selecting corresponding one or more setting items on a screen, the one or more setting items to be applied to information processing, and information of at least one of the one or more setting items corresponding to an error that occurs during the information processing as an error-occurred setting item, detecting occurrence of the error during the information processing, determining whether a setting item button corresponding to the error-occurred setting item is displayed or not on the screen when the detecting step detects the occurrence of the error during the information processing, and displaying the setting item button corresponding to the error-occurred setting item on the screen based on a determination that the setting item button corresponding to the error-occurred setting item is not displayed on the screen when the detecting step detects the occurrence of the error during the information processing.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 9 illustrates an example of an error table;

FIG. 10 illustrates an example of an option table;

FIG. 11 is an example of a flowchart illustrating the steps of processing performed by the image forming apparatus;

Figure 1:
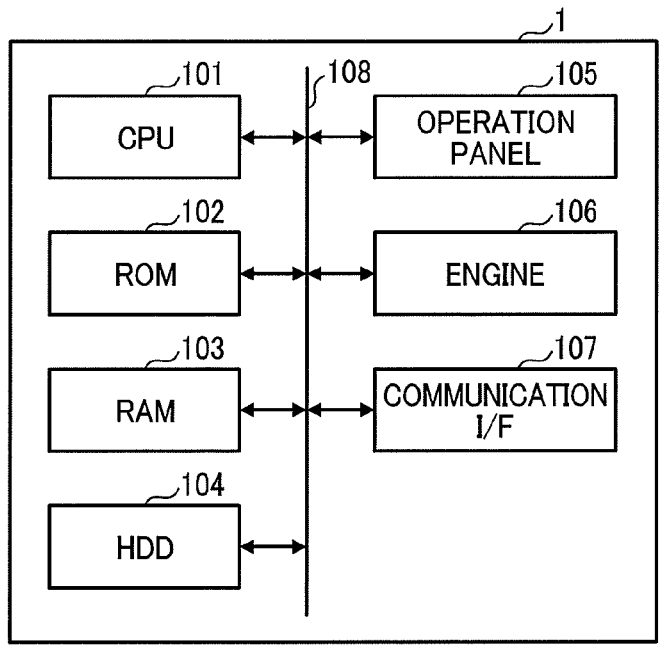
FIG. 1 illustrates an example of a hardware configuration of an image forming apparatus of an embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of each embodiment of the present invention with reference to the accompanying drawings. Regarding the specification according to each of the embodiments and the drawings, constituent elements having substantially the same functional configuration, the overlap description will be omitted by retaining the same reference numerals.

First Embodiment

A description is given of an information processing apparatus 1 according to a first embodiment with reference to FIGS. 1 to 13. The information processing apparatus 1 can be any apparatuses including an operation panel including a touch panel. The information processing apparatus 1 is, for example, an image forming apparatus, an electronic information board, a digital camera, a refrigerator, a washing machine, a microwave oven, a television, but not limited thereto. The image forming apparatus includes, for example, a multi-functional peripheral (MFP), a printer, a copier, a facsimile machine, and a scanner. In this description, the information processing apparatus 1 is described as an image forming apparatus. Therefore, the information processing apparatus 1 is also referred to as the image forming apparatus 1.

A description is given of a hardware configuration of the image forming apparatus 1 with reference to FIG. 1. FIG. 1 illustrates an example of a hardware configuration of the image forming apparatus 1. As illustrated in FIG. 1, the image forming apparatus 1 includes, for example, a central processing unit (CPU) 101, a read only memory (ROM) 102, a random access memory (RAM) 103, and a hard disk drive (HDD) 104. The image forming apparatus 1 further includes an operation panel 105, an engine 106, a communication interface (I/F) 107, and a bus 108. Further, the image forming apparatus 1 can include others such as a printer, a copier, a facsimile machine, and a scanner depending on types of the image forming apparatus 1.

The CPU 101 executes one or more programs, and controls various components to perform functions of the image forming apparatus 1. The ROM 102 stores various types of data including one or more programs to be executed by the CPU 101. The RAM 103 provides a working area to the CPU 101. The HDD 104 stores various types of data including one or more programs to be executed by the CPU 101. The operation panel 105 includes, for example, a touch panel display, and is used as an input/output device. The operation panel 105 receives an operation of a user on the touch panel, and then inputs various types of information to the image forming apparatus 1. The operation panel 105 displays various types of information used by the image forming apparatus 1 on a display. The operation panel 105 can include hardware keys as an input device. The engine 106 controls a printer, a copier, a facsimile machine, and a scanner to implement printing function, copying function, facsimile function, and scanner function corresponding to each device. The communication I/F 107 is used as an interface for connecting the image forming apparatus 1 to a network such as the Internet and local area network (LAN) wirelessly and/or by wire. The image forming apparatus 1 communicates with one or more external device disposed on the network through the communication I/F 107. The bus 108 connects the CPU 101, the ROM 102, the RAM 103, the HDD 104, the operation panel 105, the engine 106, and the communication I/F 107 with one another.

A description is given of screens displayed on the operation panel 105. In the following description, a home screen, an application screen, and a setting screen are described.

The home screen is a screen displaying one or more functions selectable by a user. In the home screen, one or more icons corresponding to respective one or more functions are displayed. The icon is used as a start button for activating the corresponding functional application. When the user selects one icon, an application that implements a function corresponding to the selected icon is activated, and an application screen of the application is displayed. In this configuration, the user selects an icon displayed on the operation panel 105 by touching the icon displayed on the operation panel 105, or the user selects a function displayed on the operation panel 105 by operating a hardware key.

Figure 2:
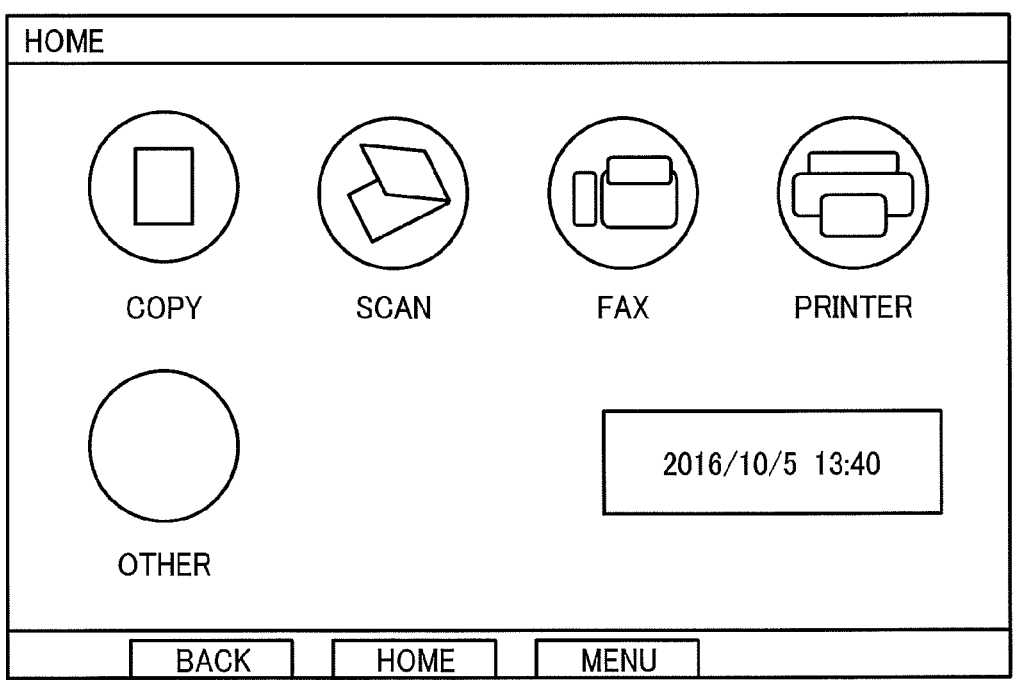
FIG. 2 illustrates an example of a home screen.

FIG. 2 illustrates an example of the home screen. In an example case of FIG. 2, the home screen displays a copy icon, a scan icon, a fax icon, a printer icon, and other icon. For example, when a user selects the copy icon, a copy application providing a copy function is activated, and then an application screen of the copy application is displayed.

Further, as illustrated in FIG. 2, the home screen displays a widget for displaying time information, a button for returning to a previous screen (BACK), a home button for shifting to the home screen (HOME), and a menu button for displaying a menu screen (MENU). Further, the home screen is not limited to the example of FIG. 2. Any button or the like can be added to or deleted from the home screen.

The application screen is a screen used by a user for selecting one or more setting items. The application screen displays a plurality of setting item buttons respectively corresponding to a plurality of setting items that the user can select. A setting item button is used by the user to select a corresponding setting item. A selection of the setting item can be performed by selecting the setting item button. When the user selects one setting item button, a setting screen of one setting item corresponding to the selected one setting item button is displayed.

Each of the setting items has, for example, a plurality of options, which are candidates of setting value. A setting value of the setting item can be selected from options set for the setting item. When a user selects one option on the setting screen, the selected one option is set as a setting value of the setting item. Therefore, when the option is selected, the setting value is selected.

Figure 3:
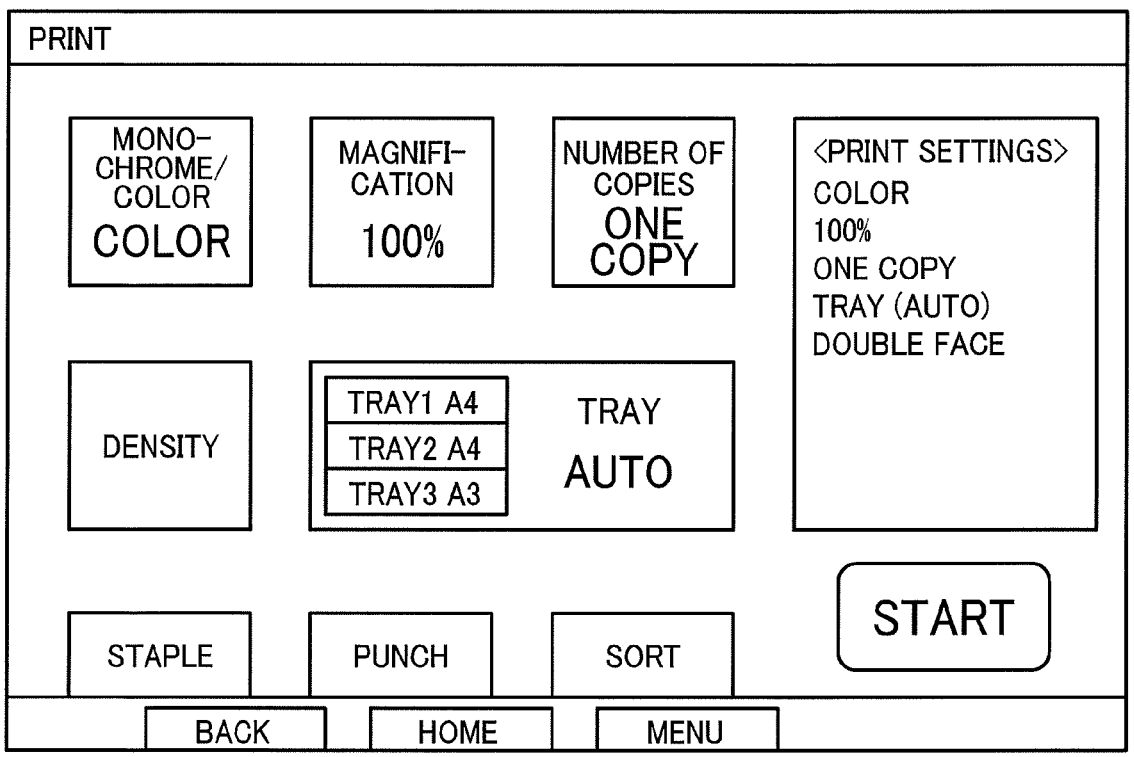
FIG. 3 illustrates an example of an application screen.

FIG. 3 illustrates an example of the application screen. The application screen of FIG. 3 is an example of a screen of a copy application used for implementing a copy function. As illustrated in FIG. 3, the application screen displays setting item buttons corresponding to such as "monochrome/color," "magnification," "number of copies," "density," "tray," "staple," "punch," and "sort." As illustrated in an example case of FIG. 3, each of the setting item buttons includes a name of corresponding setting item, and a setting value (selected option) of the corresponding setting item. Hereinafter, the setting item button corresponding to the setting item "X" is referred to as an "X button."

For example, a setting item button displayed at the top left of the application screen of FIG. 3 is referred to as a "monochrome/color" button. The "monochrome/color" button is a setting item button corresponding to a setting item of "monochrome/color." The setting item "monochrome/color" has options such as "automatic," "color," "black-and-white," and "gray scale." In an example case of FIG. 3, the "monochrome/color" button displays "color," which means the option of "color" is selected currently as the setting value of the setting item of "monochrome/color."

Similarly, in an example case of FIG. 3, a setting value of the "magnification" is "100%," and a setting value of the "number of copies" is one (1), and a setting value of the "tray" is "auto." Further, as illustrated in FIG. 3, the application screen displays a print settings section, which displays each option that is being selected, and a start button to start an execution of printing by using the image forming apparatus 1. As indicated in to the print settings section on the application screen (FIG. 3), options of "color," "100%," "1," "auto" and "double-face" are selected currently.

Further, as illustrated in FIG. 3, the application screen displays a button for returning to a previous screen (BACK), a home button for shifting to a home screen (HOME), and a menu button for displaying a menu screen (MENU). Further, the application screen is not limited to the example of FIG. 3. Any button or the like can be added to or deleted from the application screen.

The setting screen is a screen used by a user for selecting a setting value of a setting item. The setting screen display a plurality of option buttons respectively corresponding to a plurality of options that the user can select. The option button is used by the user for selecting the option. When the user selects one option button, one option corresponding to the one option button is selected. When the user selects the one option button, an option corresponding to the selected one option button is selected as a setting value of a setting item.

Figure 4:
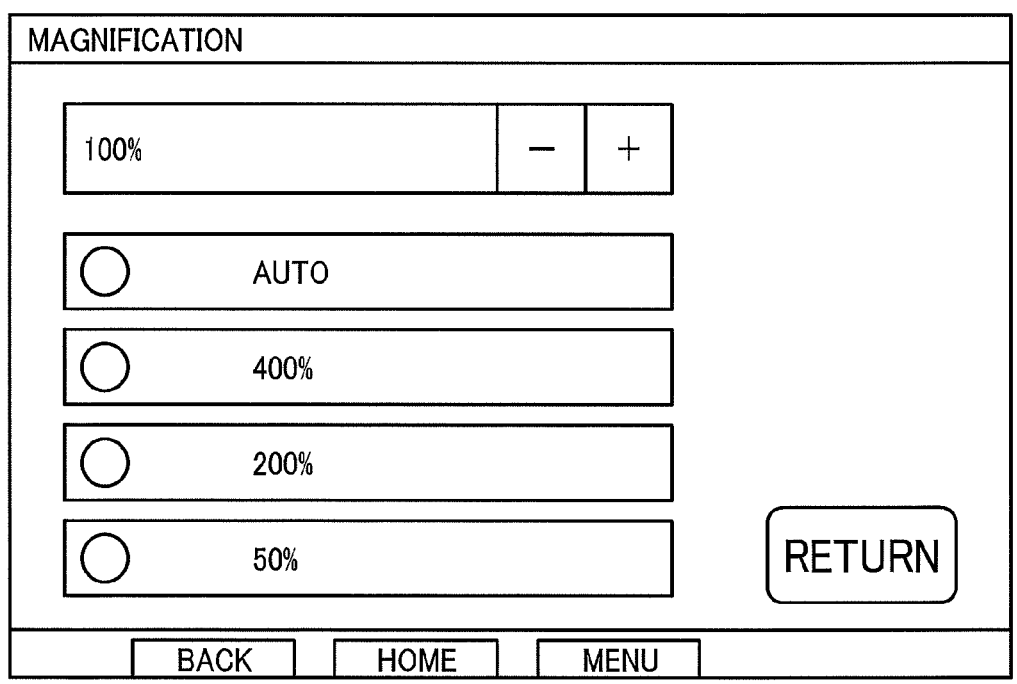
FIG. 4 illustrates an example of a setting screen.

FIG. 4 illustrates an example of the setting screen. In an example case of FIG. 4, the setting screen displays option buttons respectively corresponding to options of "auto," "400%," "200%," and "50%." In an example case of FIG. 4, each of the option buttons displays a corresponding option. Hereinafter, the option button corresponding to the option "x" is referred to as an "x button." For example, an option button at the top of the option buttons in FIG. 4 is referred to as an "auto" button. The "auto" button is an option button corresponding to the option of "auto."

Further, as illustrated in FIG. 4, the setting screen displays a button for returning to a previous screen (RETURN), and a magnification column displaying a magnification that is set currently. In an example case of FIG. 4, the currently set magnification is 100%. Further, as illustrated in FIG. 4, the setting screen displays an increase button (+) and a decrease button (−) used for changing the currently-set magnification. When a user selects 400% on the setting screen, 400% is selected as the setting value of the magnification, and 400% is displayed in the magnification column.

Further, as illustrated in FIG. 4, the setting screen displays a button for returning to a previous screen (BACK), a home button for shifting to a home screen (HOME), and a menu button for displaying a menu screen (MENU). Further, the setting screen is not limited to the example of FIG. 4. Any button or the like can be added to or deleted from the setting screen.

A description is given of an outline of the image forming apparatus 1 of the first embodiment. In the following description, the setting item "tray" is used as an example of the setting items.

Figure 5:
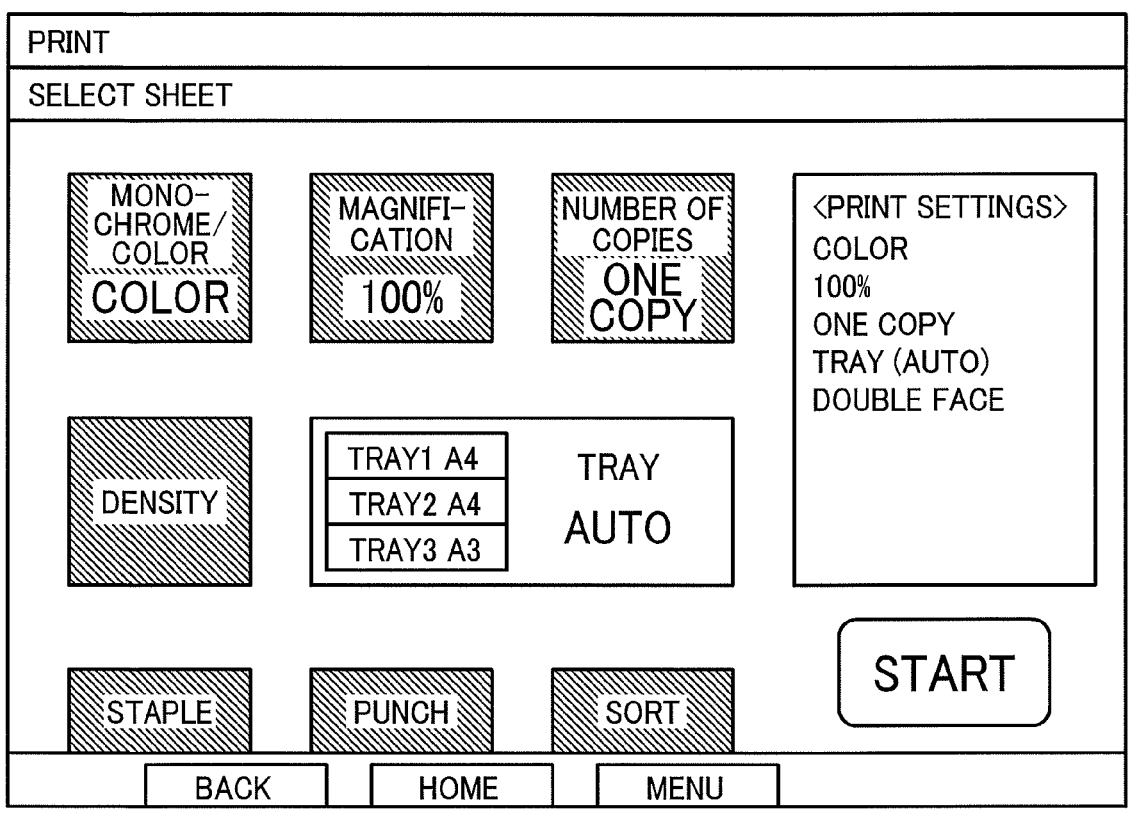
FIG. 5 illustrates an example of an application screen when an error occurs in a conventional image forming apparatus.
Figure 6:
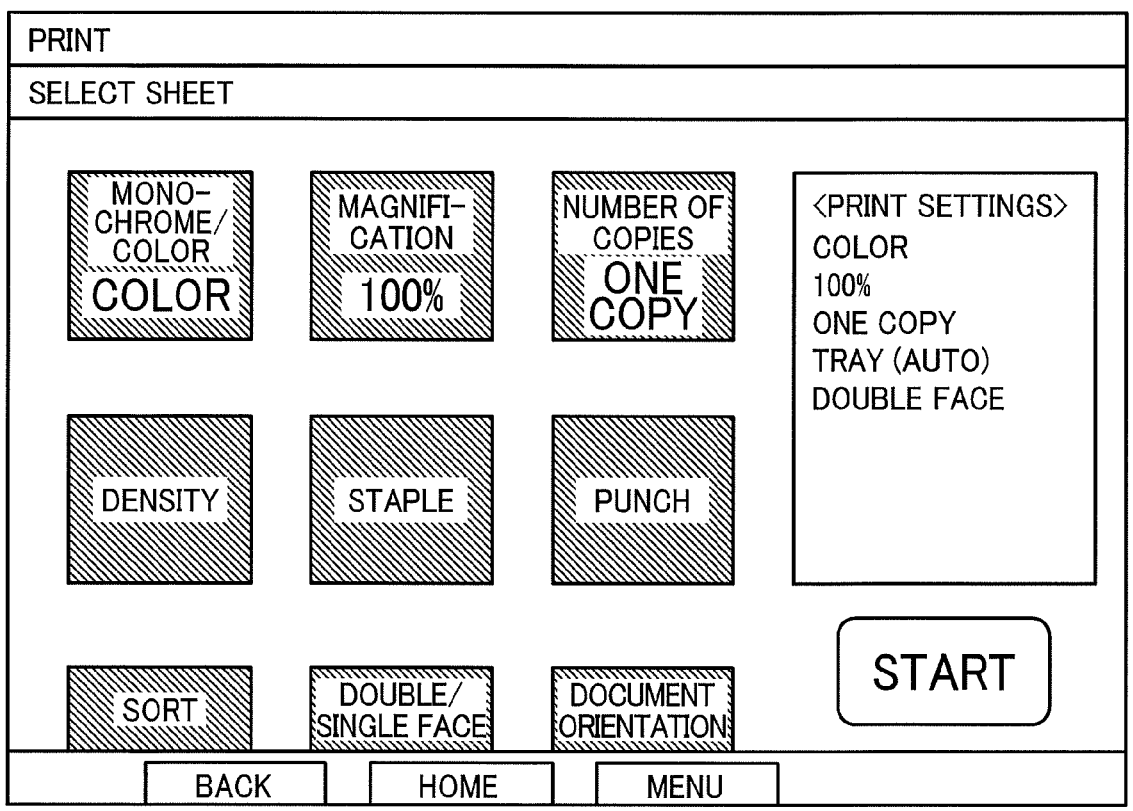
FIG. 6 illustrates another example of an application screen when an error occurs in a conventional image forming apparatus.

FIG. 5 and FIG. 6 illustrate examples of an application screen when an error occurs in a conventional image forming apparatus. In example cases of FIG. 5 and FIG. 6, it is assumed that "auto" is selected as a setting value for the setting item of "tray," and then a copy job is executed. When executing the copy job, the conventional image forming apparatus cannot automatically select a tray (or sheet) when a sheet used as a recording medium has irregular shape or the like. If the "AUTO" is set for the tray in such case, an error occurs as illustrated in FIG. 5 and FIG. 6. In the example cases of FIG. 5 and FIG. 6, an error message of "select sheet" is displayed on the application screen because the tray (or sheet) cannot be selected automatically.

In the example case of FIG. 5, the tray button is displayed on the application screen. In this case, a user can select the tray button to change a setting value of the setting item of "tray" to a setting value (i.e., option) of "tray 2" to cancel the error. By contrast, in the example case of FIG. 6, the tray button is not displayed on the application screen. In this case, the user cannot change the setting value of the setting item "tray," and thereby the errors cannot be cancelled.

As described above, in conventional image forming apparatuses, when the setting item button corresponding to the error is not displayed, the user cannot change the setting value of the setting item corresponding to the setting item button, and thereby the errors cannot be cancelled. In this description, the setting item button corresponding to the error means the setting item button corresponding to the setting item corresponding to the error.

Therefore, the image forming apparatus 1 of the first embodiment is configured to display a setting item button corresponding to an error on the application screen if the setting item button corresponding to the error is not displayed when the error is detected. With this configuration, even if the setting item button corresponding to the error is not displayed when the error is detected, a user can change the setting value of the setting item corresponding to the error, with which the error can be canceled.

Figures 7, 8:
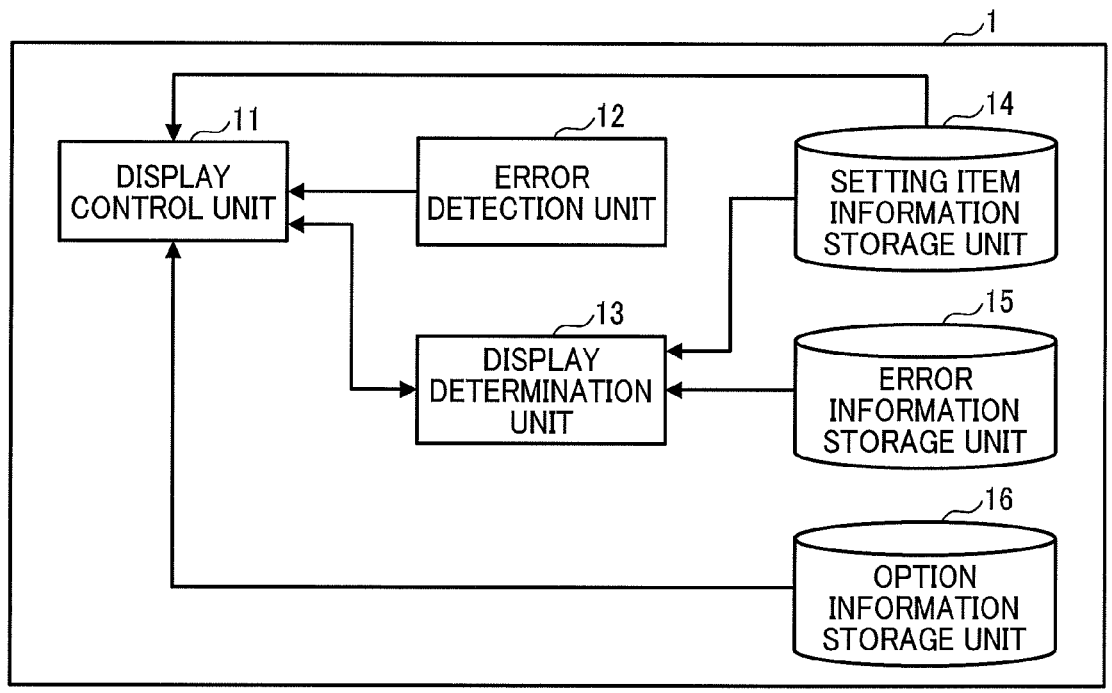
FIG. 7 illustrates an example of a functional block diagram of an image forming apparatus of an embodiment.
FIG. 8 illustrates an example of a setting item table.

A description is given of a functional configuration of the image forming apparatus 1 of the first embodiment. FIG. 7 illustrates an example of a functional block diagram of the image forming apparatus 1. As illustrated in FIG. 7, the image forming apparatus 1 includes, for example, a display control unit 11, an error detection unit 12, a display determination unit 13, a setting item information storage unit 14, an error information storage unit 15, and an option information storage unit 16. These functions can be implemented by executing one or more programs by the CPU 101.

The display control unit 11 controls a screen displayed on the display of the operation panel 105. Specifically, when an icon is selected by a user on a home screen, the display control unit 11 switches the home screen to an application screen of an application function corresponding to the selected icon. Further, when a setting item button is selected by a user on an application screen, the display control unit 11 switches the application screen to a setting screen of a setting item corresponding to the selected setting item button. Further, when the "RETURN" button is selected by a user on any screen, the display control unit 11 switches the currently displayed screen to a screen that was displayed previously. For example, when the "RETURN" button is selected on the setting screen, the display control unit 11 switches the setting screen to the application screen.

Further, the display control unit 11 performs a screen control such as an arrangement or layout of parts such as buttons and widgets displayed on the screen, description of text on the part or a text field, and a screen operation (e.g., scrolling, enlargement, reduction) corresponding to a user operation on the screen.

Further, the display control unit 11 displays a setting item button under a non-displayed status on the application screen by determining a type of error that has occurred while executing a job. The detail of displaying the setting item button under the non-displayed status will be described later.

When an error occurs while executing a job, the error detection unit 12 detects the error based on information received from a device (e.g., printing device) that is executing the job. The information received from the device that is executing the job includes, for example, an error ID to be described later.

The display determination unit 13 determines a display status of a setting item button corresponding to an error. In other words, the display determination unit 13 determines whether the setting item button corresponding to the error is displayed on the application screen at the time of occurrence of the error.

The setting item information storage unit 14 stores information of each setting item (hereinafter "setting item information"). FIG. 8 illustrates an example of setting item information stored as a setting item table in a memory. In an example case of FIG. 8, each record corresponds to the setting item information of each setting item. In an example case of FIG. 8, the setting item information includes information items such as "setting-item ID," "name," "position," and "display." The "setting-item ID" indicates an identifier identifying each setting item. The "name" indicates a name of each setting item.

The "position" indicates a position for displaying the setting item button corresponding to the setting item. In this configuration, the "position" means a position in an arrangement region prepared in advance for arranging the setting item buttons. In one example configuration of the first embodiment, it is assumed that an arrangement region (layout region) that can arrange the setting item buttons in "N rows and 3 columns" is provided. Specifically, a position at the upper left corner of the arrangement region is set as "1", and a position at the upper right corner of the arrangement region is set as "3." The application screen displays at least a part of the arrangement region including various setting item buttons arranged at given corresponding positions. In this example case, the "position" of the setting item "tray" is specified with "5, 6" because the setting item "tray" is arranged by using two positions (see FIG. 5).

The "display" indicates a display status of the setting item button corresponding to the setting item. The "Y" in "display" indicates that the setting item button is under the displayed status, and the "N"" in "display" indicates that the setting item button is under the non-displayed status. The setting item button set with the "display" of "Y" corresponds to the setting item button that is displayed on the screen, and the setting item button set with the "display" of "N" corresponds to the setting item button that is not displayed on the screen. The display status can be changed and set by a user.

The error information storage unit 15 stores information on each error (hereinafter "error information"). FIG. 9 illustrates an example of an error table storing error information. In an example case of FIG. 9, each record corresponds to error information for each error. In an example case of FIG. 9, the error information includes information items such as "error ID," "error message," and "setting-item ID." The "error ID" indicates an identifier identifying each error. The "error message" indicates a message to be displayed on the application screen when an error occurs. The "error message" indicates the cause of the error and a countermeasure, and is prepared in advance for each error. The "setting-item ID" indicates an identifier identifying the setting item corresponding to the error. The setting item corresponding to the error is a setting item that can be used to cancel the error by changing the setting value, and the setting item corresponding to the error can be set in advance. The number of the setting items corresponding to the error may be one or plural.

In an example case of FIG. 9, an error having an error ID 01 indicates an error that a use of punch is set for a sheet but the punch cannot be used for the sheet. If this error occurs, an error message of "Sheet cannot be punched. Reselect sheet or cancel punch" is displayed on the application screen. Further, as the setting items corresponding to the error having the error ID 01, the setting item "tray" having the setting item ID of "05" and the setting item "punch" having the setting item ID of "07" are set.

In an example case of FIG. 9, an error having an error ID 02 indicates an error that color toner is insufficient for executing color printing. If this error occurs, an error message of "toner (color) is insufficient. Exchange cartridge or print in monochrome" is displayed on the application screen. Further, as a setting item corresponding to the error having the error ID 02, the setting item "monochrome/color" having the setting item ID of "01" is set.

In an example case of FIG. 9, an error having an error ID 03 indicates an error that double-side copy is set when all trays are set for single-sided copy. If this error occurs, an error message of "All trays are set for single-sided copy. Double-sided copy cannot be used. Cancel double-sided copy" is displayed on the application screen. Further, as a setting item corresponding to the error having the error ID 03, the setting item "double/single face" having the setting item ID of "09" is set.

In an example case of FIG. 9, an error having an error ID 04 indicates an error that "auto" is selected as a setting value for the setting item of "tray" and then a copy job was executed. If this error occurs, an error message of "select sheet" is displayed on the application screen. Further, as a setting item corresponding to the error having the error ID 04, the setting item "tray" having the setting item ID of "05" is set.

The option information storage unit 16 stores information on each option (hereinafter, "option information"). FIG. 10 illustrates an example of an option table storing option information as selectable option. In an example case of FIG. 10, each record corresponds to the option information of each option.

In an example case of FIG. 10, the option information includes information items such as "option ID," "setting-item ID," "name," "selection," "exclusive option," and "exclusive processing." The "option ID" indicates an identifier identifying each option. The "setting-item ID" indicates an identifier identifying each setting item having one or more options. The "name" indicates a name of each option. The "selection" indicates a selection status of each option whether the each option is selected. The "Y" in "selection" indicates that the option is selected, and the "N" in "selection" indicates that the option is not selected (i.e., non-selected option).

In an example case of FIG. 10, it is assumed that one option table stores the option information of all of the setting items, but not limited thereto. For example, one option table can be provided for each setting item.

A description is given of processing performed by the image forming apparatus 1. FIG. 11 is an example of a flowchart illustrating the steps of a process performed by the image forming apparatus 1. The sequence of FIG. 11 is started when an error occurs while executing a job. In the following description, it is assumed that an application screen is displayed on the operation panel 105 at the start of the sequence of FIG. 11.

When an error occurs, a device (e.g., printing device) that is executing a job transmits information including an error ID associated to the error that has occurred to the engine 106. The error detection unit 12 detects an occurrence of the error based on the information received by the engine 106 (step S101). When the error detection unit 12 detects the error, the error detection unit 12 transfers the error ID of the occurred error to the display control unit 11.

When the display control unit 11 receives the error ID, the display control unit 11 transfers the error ID to the display determination unit 13. When the display determination unit 13 receives the error ID, the display determination unit 13 determines whether one or more setting item buttons corresponding to the occurred errors are not being displayed (i.e., non-displayed status) (step S102).

Specifically, the display determination unit 13 searches the error table (FIG. 9) using the error ID as a search key to acquire one or more setting item IDs (hereinafter, setting item ID), of one or more setting items (hereinafter, setting item) corresponding to the error detected at step S101. Then, the display determination unit 13 searches the setting item table (FIG. 8) by using the acquired setting item ID as a search key to acquire setting item information of the setting item having the corresponding setting item ID, and checks the display status included in the acquired setting item information, in which a value of information item "display" (FIG. 8) is checked. When the display determination unit 13 confirms that a setting item button under the non-displayed status (i.e., value of information item "display" is "N") exists based on a check result, the display determination unit 13 determines that the setting item button corresponding to the error and under the non-displayed status exists. By contrast, when the display determination unit 13 confirms that no setting item button under the non-displayed status (i.e., value of information item "display" is "N") exists, the display determination unit 13 determines that no setting item button corresponding to the error and under the non-displayed status exists.

When the display determination unit 13 determines that the setting item button corresponding to the error and under the non-displayed status exists (step S102: YES), the display determination unit 13 reports the existence of the setting item button corresponding to the error and under the non-displayed status to the display control unit 11. Further, the display determination unit 13 transfers the setting item ID of the setting item button corresponding to the error, the setting item ID of the setting item button under the non-displayed status, and an error message corresponding to the error to the display control unit 11.

When the display control unit 11 receives the setting item ID of the setting item button under the non-displayed status, the display control unit 11 displays the setting item button associated to the received setting item ID on the application screen as a selectable setting item button (step S103). At this timing, the display control unit 11 is not required to change the value of the information item "display" included in the setting item information to "Y" (FIG. 8). A method of displaying the setting item button under the non-displayed status will be described later.

Then, the display control unit 11 sets one or more setting item buttons corresponding to the error as one or more selectable setting item buttons, and one or more setting item buttons not corresponding to the error as one or more non-selectable setting item buttons among the setting item buttons displayed on the application screen (step S104). With this configuration, unnecessary operation is not performed by a user, and a cancellation of the error by changing a setting value of the setting item corresponding to the error can be clearly requested to the user.

In a case of displaying the setting item button under the displayed status as the non-selectable setting item button, the display control unit 11 can display the non-selectable setting item button with a style different from the selectable setting item button illustrated in FIG. 5. Specifically, the non-selectable setting item button can be displayed by decreasing luminance, changing color or the like of the non-selectable setting item button.

Then, the display control unit 11 displays the error message received from the display determination unit 13 in a given area on the application screen (step S105). When the user confirms the error message, the user can understand the cause of the error, and a countermeasure. Further, when the user select the setting item button corresponding to the error, and changes a setting value of the setting item corresponding to the selected setting item button, the error can be canceled. After cancelling the error, the display control unit 11 can set the setting item button displayed on the application screen for cancelling the error to the setting item button under the non-displayed status again, with which an initial configuration of the setting item buttons on the application screen can be maintained.

By contrast, when the display determination unit 13 determines that the setting item button corresponding to the error and under the non-displayed status does not exist (step S102: NO), the display determination unit 13 reports the non-existence of the setting item button under the non-displayed status to the display control unit 11. Further, the display determination unit 13 transfers the setting item ID of the setting item button corresponding to the error, and the error message corresponding to the error to the display control unit 11. Then, the sequence proceeds to step S104.

A description is given of a method of displaying the setting item button under the non-displayed status. Hereinafter, it is assumed that the tray button is used an example of the setting item button under the non-displayed status.

(First Display Method)

A description is given of a first display method that displays the setting item button under the non-displayed status. As to the first display method, a display area for displaying the setting item button under the non-displayed status is generated, and then the setting item button under the non-displayed status is displayed in the generated display area. For example, the display area can be generated by shifting a position of all of setting item buttons under the displayed status for a given length in a given direction, in which the given length and the given direction can be any values.

Figure 12A:
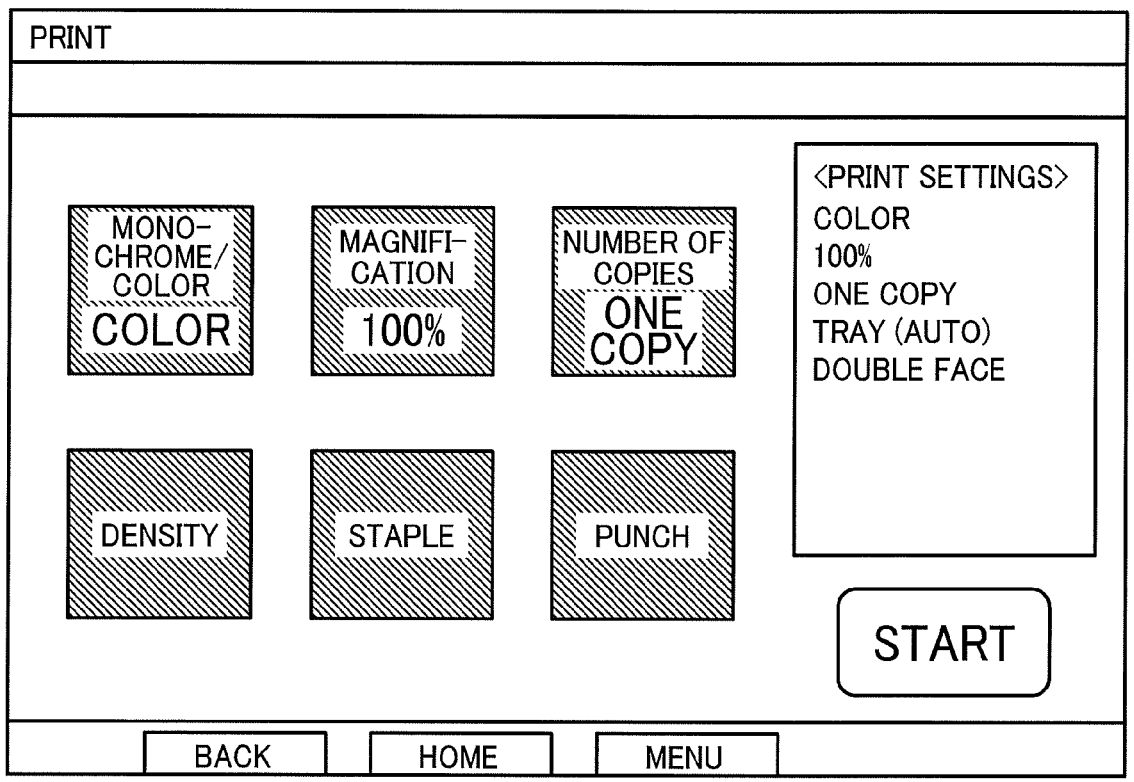
FIGS. 12A, 12B, and 12C illustrate an example of a tray button displayed by a first display method.
Figure 12B:
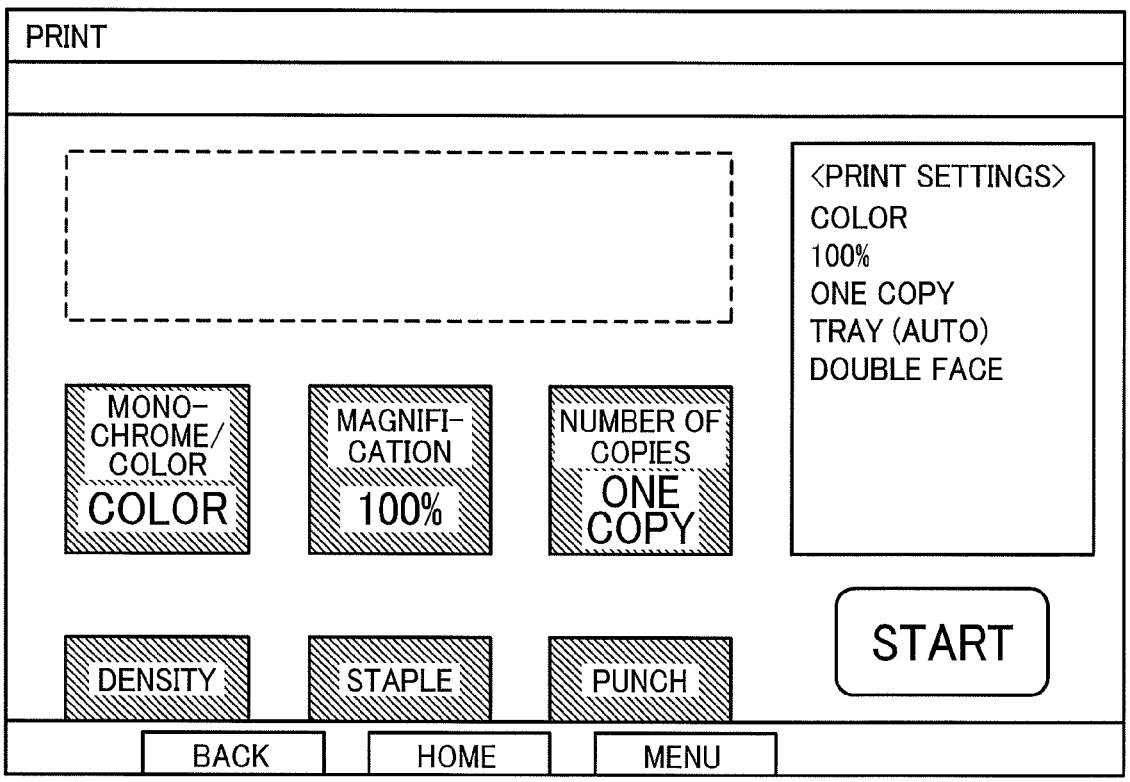
Figure 12C:
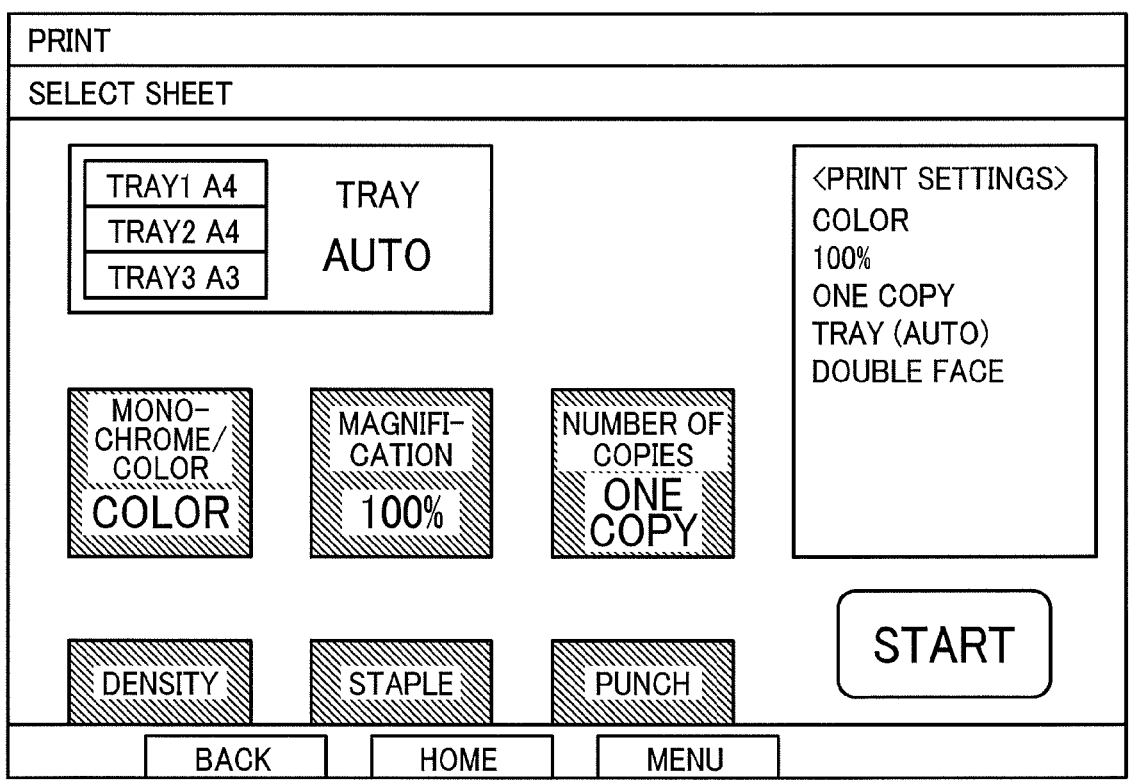

FIG. 12 illustrates an example of displaying the tray button under the non-displayed status by using the first display method. In an example case of FIG. 12, the display area (i.e., dotted line in FIG. 12B) is generated by shifting a position of the setting item buttons under the displayed status on the application screen into a lower direction for one line as illustrated in FIGS. 12A and 12B. Then, the tray button is displayed in the display area as illustrated in FIG. 12C, which is generated at the upper side of the setting item buttons under the displayed status. The positions of the setting item buttons can be shifted to any one direction for one or more lines.

In the first display method, when the number of the setting item buttons under the non-displayed status corresponding to the error is two or more, each of the setting item buttons under the non-displayed status corresponding to respective error can be displayed in the display area. Further, if a plurality of setting item buttons corresponding to errors exist, and some of setting item buttons corresponding to the errors are not displayed such as a first setting item button corresponding to an error is not displayed and a second setting item button corresponding to an error is displayed, the first setting item button under the non-displayed status alone is displayed in the display area, or all of the plurality of setting item buttons such as the first setting item button and the second setting item button corresponding to the errors can be displayed in the display area.

(Second Display Method)

A description is given of a second display method that displays the setting item button under the non-displayed status. As to the second display method, a position (first position) displaying one setting item button under the displayed status is changed to another position (second position) to generate a vacant position at the first position, and then a setting item button under the non-displayed status is displayed in the vacant position. The vacant position can be also referred to as the open position. Further, the vacant position can be set in advance as a position on the application screen. Further, the vacant position can be a position adjacent to other setting item button corresponding to an error. The vacant position corresponds to the display area generated by the above described first display method.

Figure 13A:
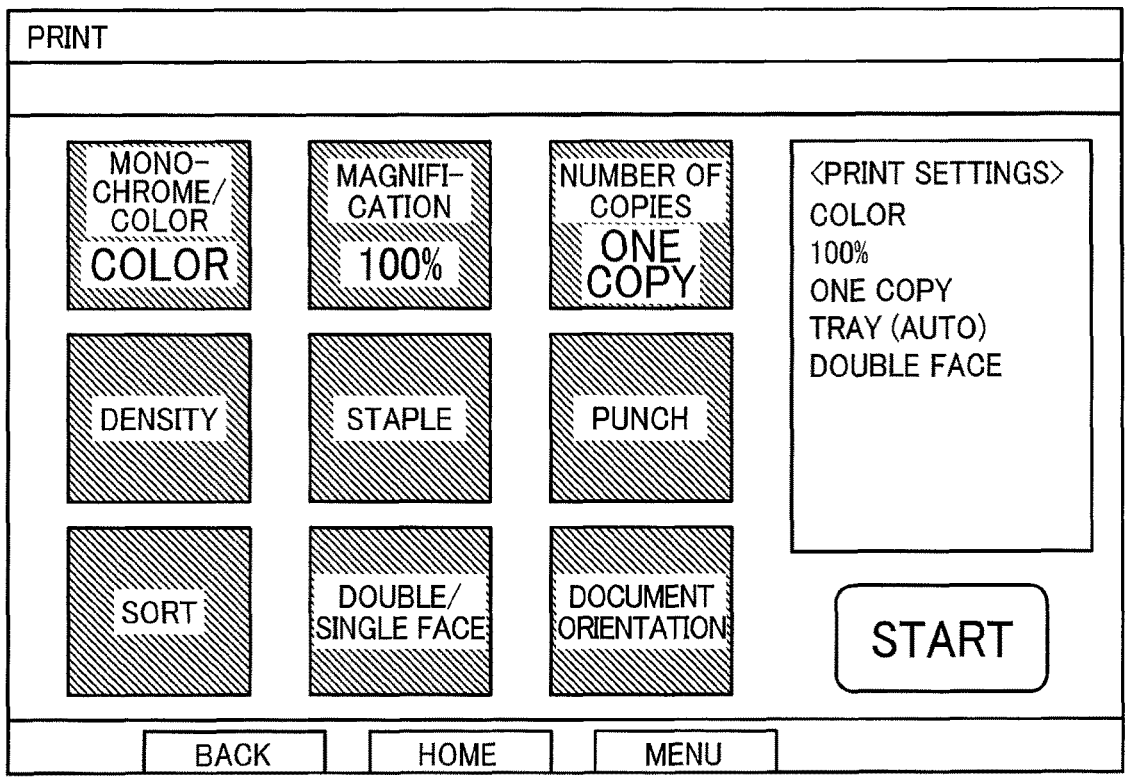
FIGS. 13A, 13B, and 13C illustrate an example of a tray button displayed by a second display method.
Figure 13B:
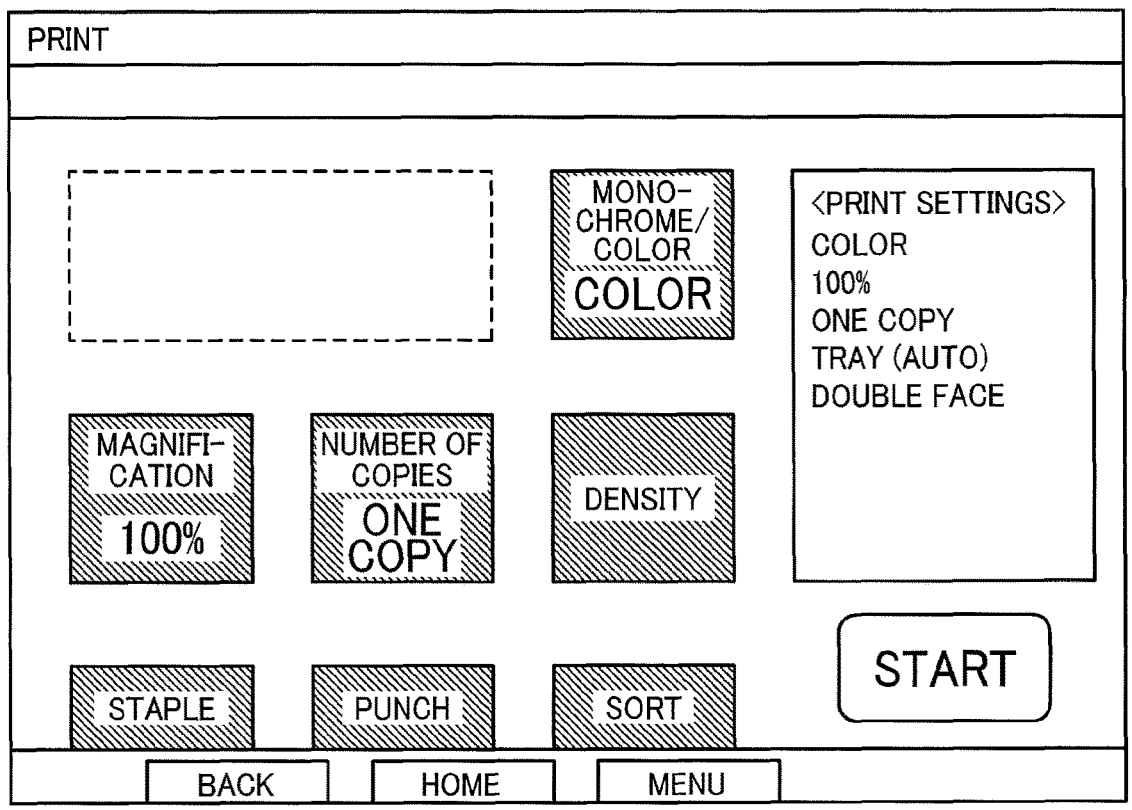
Figure 13C:
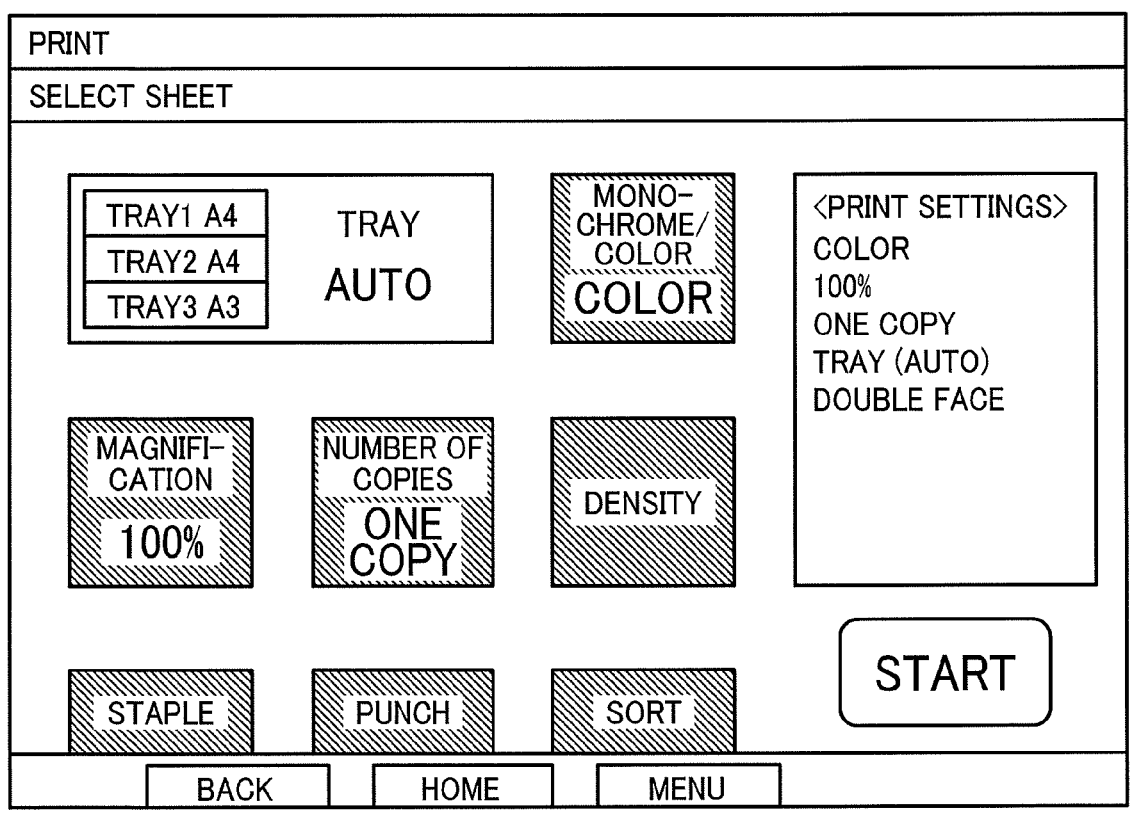

FIG. 13 illustrates an example of displaying the tray button by using the second display method. In an example case of FIG. 13, the vacant position (i.e., dotted line in FIG. 13B) is generated at the upper left of the application screen. Therefore, the tray button is displayed at the upper left of the application screen as illustrated in FIG. 13C. To display the tray button at the vacant position, the positions of the setting item buttons are shifted for a given number of position, respectively. For example, a position of the "monochrome/color" button is shifted from the position "1" to the position "3" as illustrated in FIGS. 13A and 13B. The position of the setting item button can be shifted for one or more.

In the second display method, when the number of the setting item buttons under the non-displayed status corresponding to the error is two or more, the setting item buttons under the non-displayed status corresponding to respective error can be displayed in the vacant position by arranging the setting item buttons. Further, if a plurality of setting item buttons corresponding to errors exist, and some of setting item buttons corresponding to the errors are not displayed such as a first setting item button corresponding to an error is not displayed and a second setting item button corresponding to an error is displayed, the first setting item button under the non-displayed status can be displayed in the vacant position, which is set adjacent to the second setting item button under the displayed status.

As described above in the first embodiment, when the setting item button corresponding to the error is not displayed (i.e., setting item button is under the non-displayed status), the setting item button corresponding to the error and under the non-displayed status can be displayed as the selectable setting item button on the application screen by using any one of the above described first display method and the second display method. Therefore, even when the setting item button corresponding to the error is not displayed, the setting item button corresponding to the error and under the non-displayed status can be displayed and selected, and then the error can be canceled by changing the setting value of the setting item corresponding to the error.

Second Embodiment

A description is given of an image forming apparatus 1 of a second embodiment with reference to FIG. 14. The configuration of the image forming apparatus 1 of the second embodiment is similar to the first embodiment.

In the second embodiment, when a setting item button corresponding to an error under the non-displayed status exists, the display control unit 11 displays a "setting change" button on the application screen instead of displaying the setting item button under the non-displayed status, in which the "setting change" button is used to change a setting value of the setting item corresponding to the setting item button under the non-displayed status. When a user selects (e.g., presses) the setting change button, a setting value of a setting item corresponding to the setting item button under the non-displayed status can be changed to cancel the error. The second embodiment is applicable to a configuration when the number of the setting item button under the non-displayed status is one. In the second embodiment, the "setting change" button is displayed at step S103 instead of the setting item button.

Figure 14A:
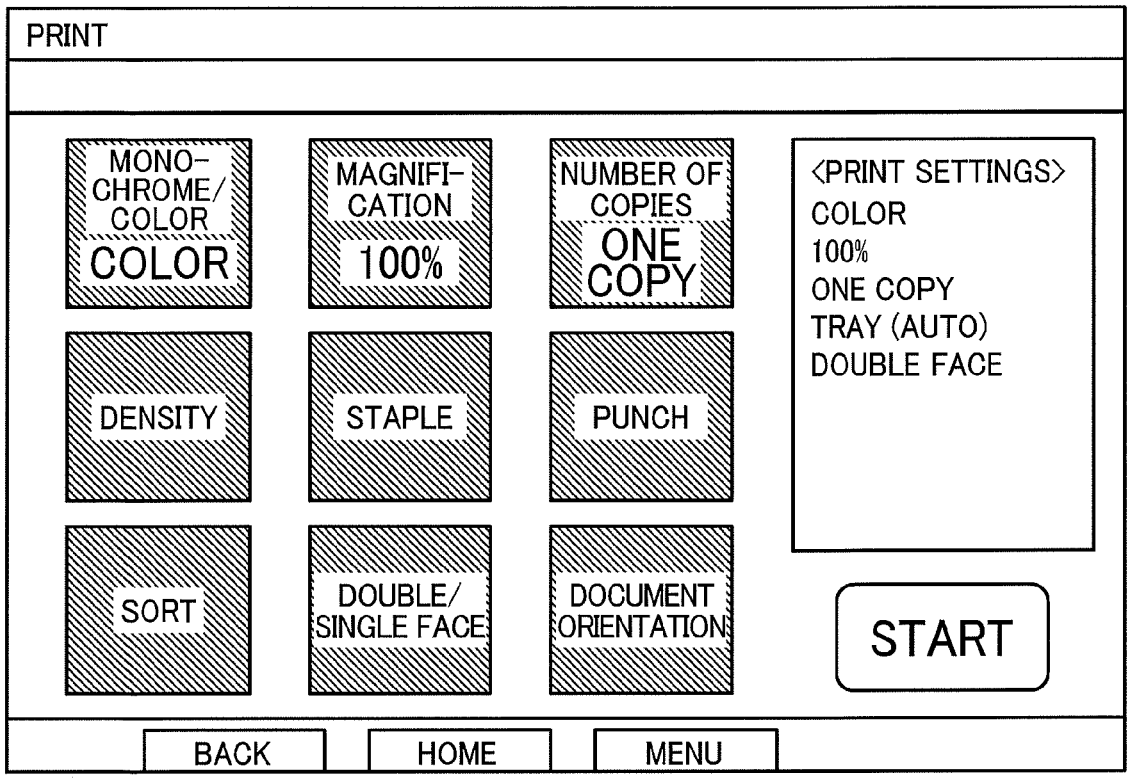
FIGS. 14A, 14B, and 14C illustrate an example of an application screen displaying a setting change button.
Figure 14B:
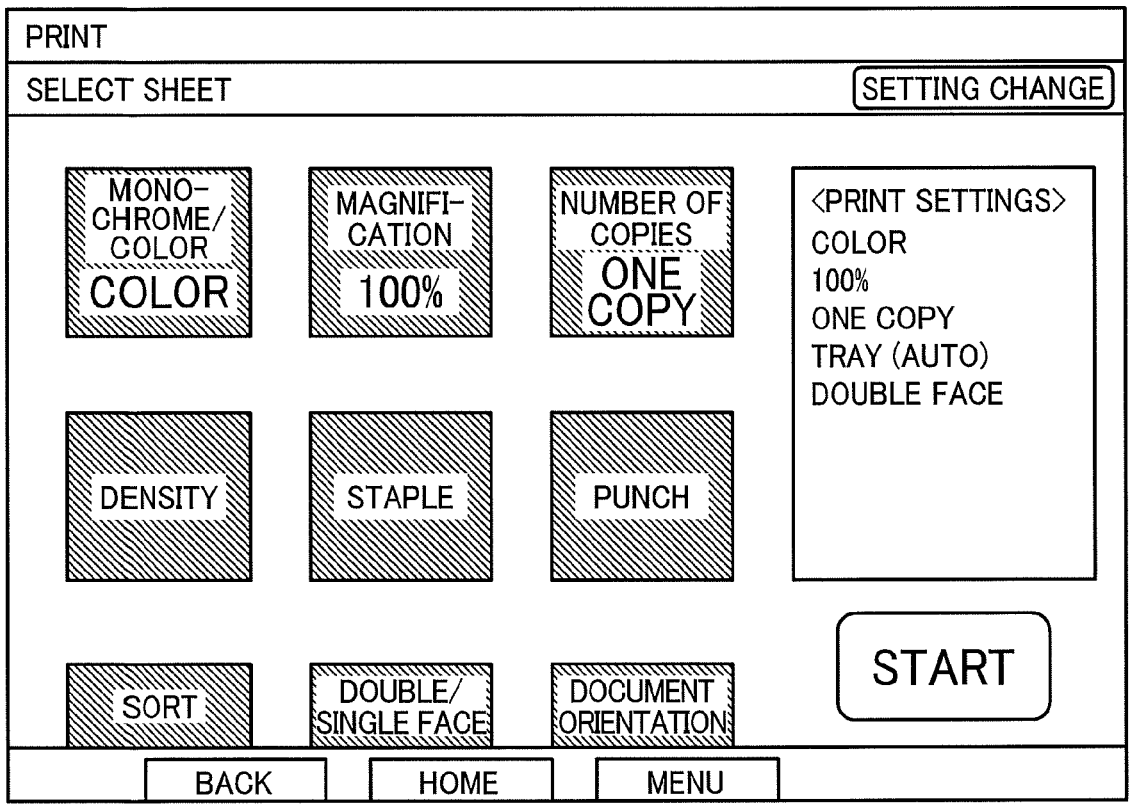
Figure 14C:
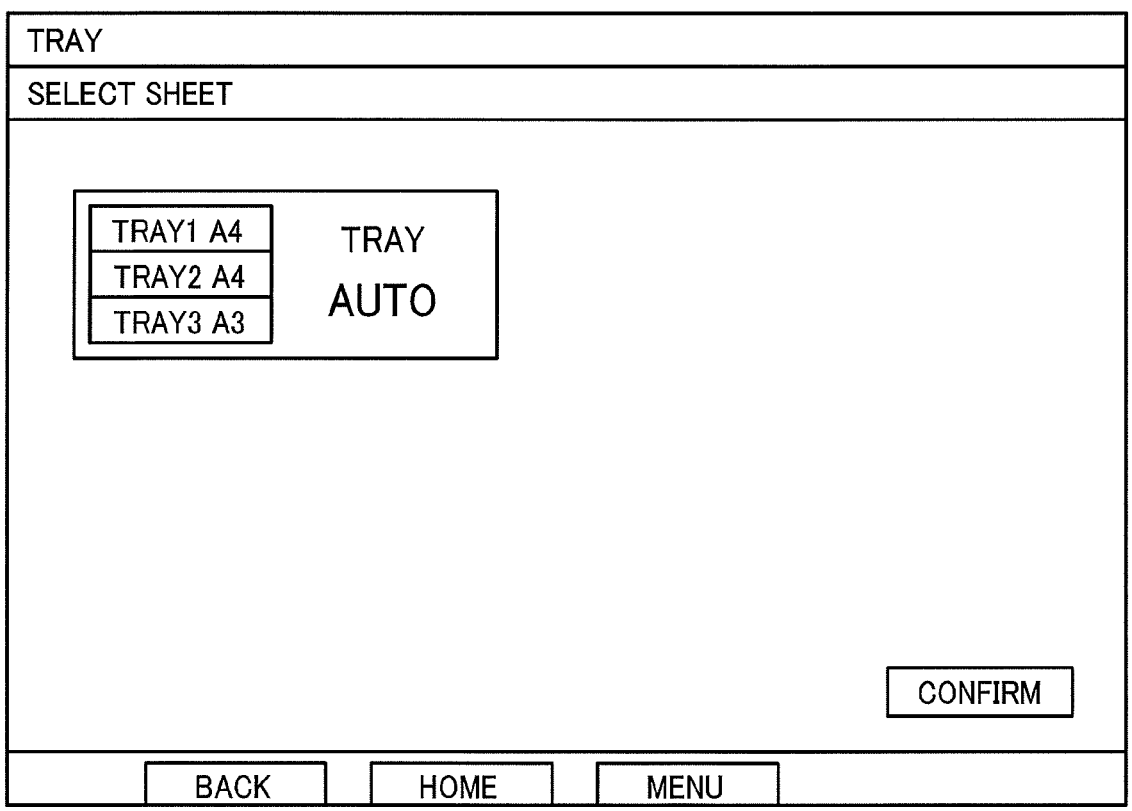

FIG. 14 illustrates an example of an application screen displaying the "setting change" button. In an example case of FIG. 14, a tray button is used as an example of setting item button corresponding to an error and under the non-displayed status. In this example case of FIG. 14, the application screen is not displaying the tray button when an error occurs (FIG. 14A), and then the "setting change" button is displayed (FIG. 14B). When the "setting change" button is selected (e.g., pressed), a setting screen of the setting item "tray" is displayed as illustrated in FIG. 14C.

In the second embodiment, if the number of setting value of the setting item corresponding to the "setting change" button and under the non-displayed status that can cancel the error is one, the setting value can be changed directly to the setting value that can cancel the error by selecting (e.g., pressing) the "setting change" button.

As described above in the second embodiment, when the setting item button corresponding to the error is not displayed (i.e., setting item button corresponding to the error is under the non-displayed status), the "setting change" button used for changing the setting value of the setting item corresponding to the setting item button under the non-displayed status is displayed on the application screen as a selectable button. Therefore, even when the setting item button corresponding to the error is under the non-displayed status, the "setting change" button can be selected, and then the error can be canceled by changing the setting value of the setting item corresponding to the setting item button under the non-displayed status.

Third Embodiment

Figure 15:
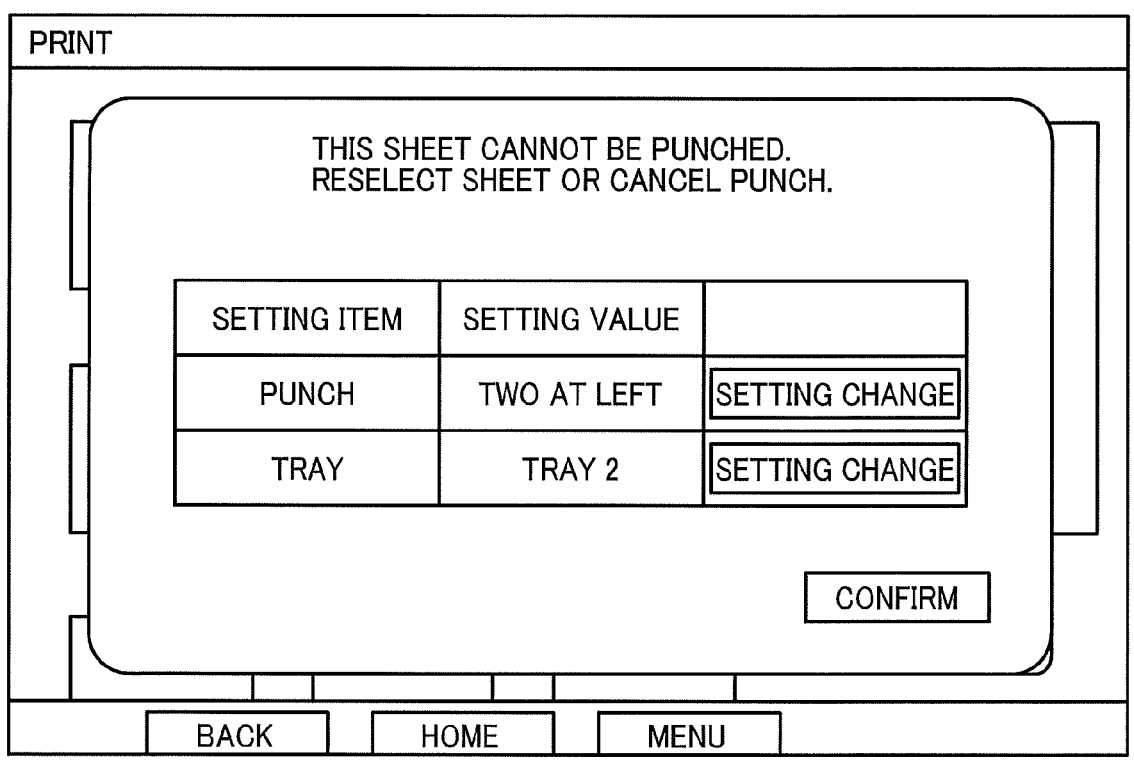
FIG. 15 illustrates an example of an application screen displaying a dialog box.

A description is given of an image forming apparatus 1 of a third embodiment with reference to FIG. 15. The configuration of the image forming apparatus 1 of the third embodiment is similar to the first embodiment.

In the third embodiment, when a setting item button corresponding to an error and under the non-displayed status exists, the display control unit 11 displays a dialog box on the application screen instead of displaying the setting item button under the non-displayed status, in which the dialog box can be used for changing a setting value of the setting item corresponding to the error. For example, the dialog box includes an error message corresponding to the error, and a "setting change" button for changing the setting value of each setting item corresponding to the error as illustrated in FIG. 15. When a user selects (e.g., presses) the "setting change" button, a setting value of the setting item corresponding to the error can be changed to cancel the error. The third embodiment is applicable to a configuration when the number of the setting item corresponding to the error is one or more.

FIG. 15 illustrates an example of the dialog box displayed on the application screen. In an example case of FIG. 15, it is assumed that the error having the error ID E01 has occurred, in which the dialog box displays an error message of "This sheet cannot be punched. Reselect sheet or cancel punch." The dialog box further displays a name (e.g., punch, tray), a setting value (e.g., two at left, tray 2), and a "setting change" button set for each setting item corresponding to the error. When a user selects (e.g., presses) the "setting change" button, a setting screen of the setting item corresponding to the selected setting change button is displayed. The user can change one or more setting values in the displayed setting screen. The dialog box further displays a "confirm" button (e.g., OK button). When the user selects (e.g., presses) the "confirm" button, a change of the setting value, performed in the dialog box, is set to the image forming apparatus 1.

As described above in the third embodiment, the dialog box used for changing the setting value of the setting item corresponding to the error can be displayed as selectable option on the application screen. Therefore, even when the setting item button corresponding to the error is not displayed, the "setting change" button displayed in the dialog box can be selected to change the setting value of the setting item corresponding to the setting item button under the non-displayed status, with which the error can be canceled. In the third embodiment, the dialog box is displayed at step S103 instead of the setting item button.

Fourth Embodiment

Figure 16A:
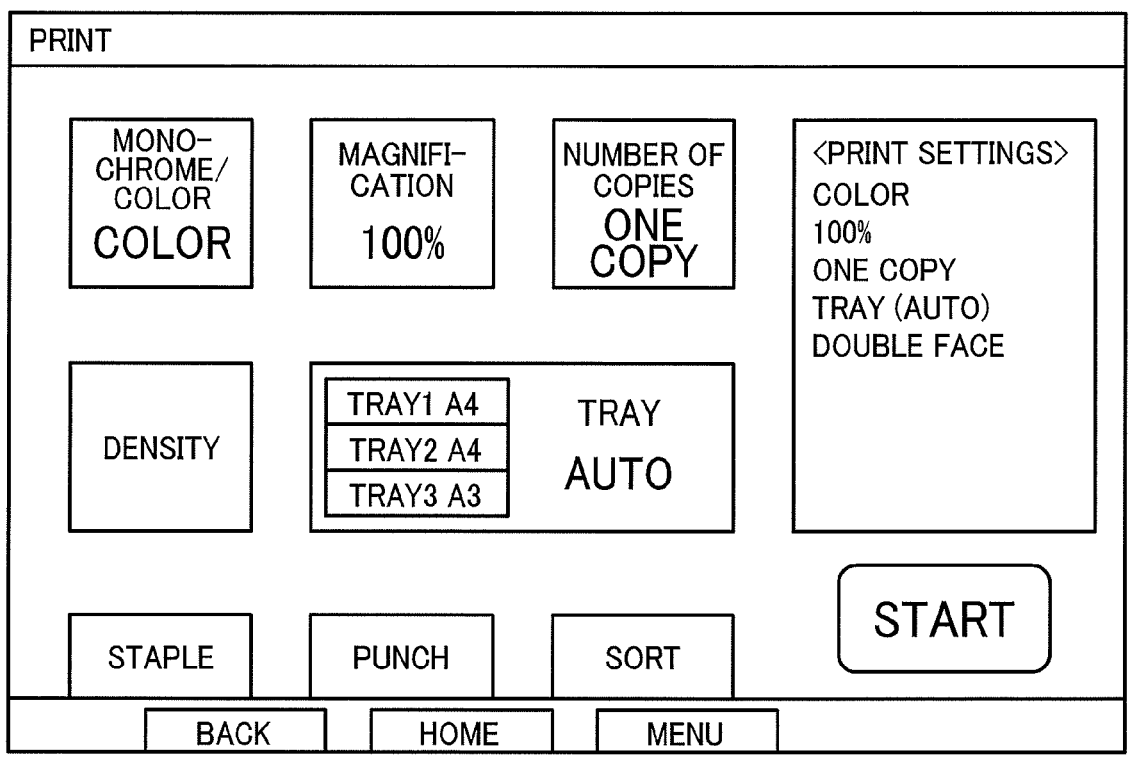
FIGS. 16A, 16B, and 16C illustrate an example of an application screen of a customization mode.
Figure 16B:
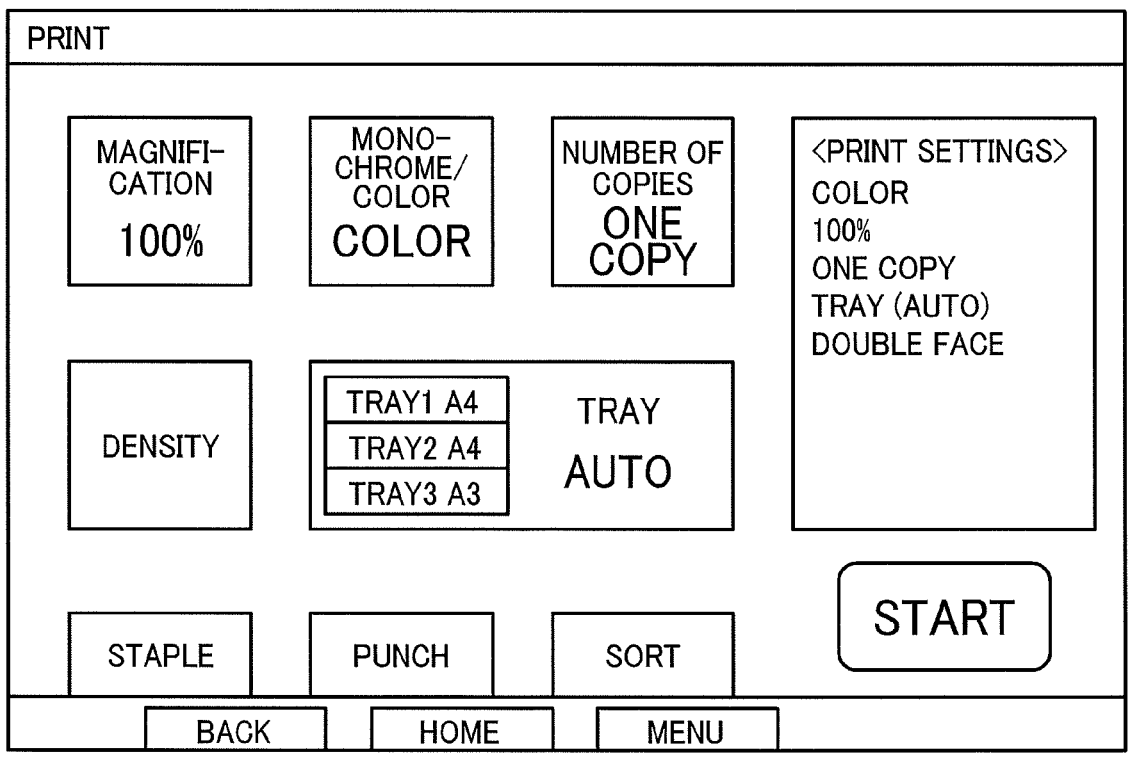
Figure 16C:
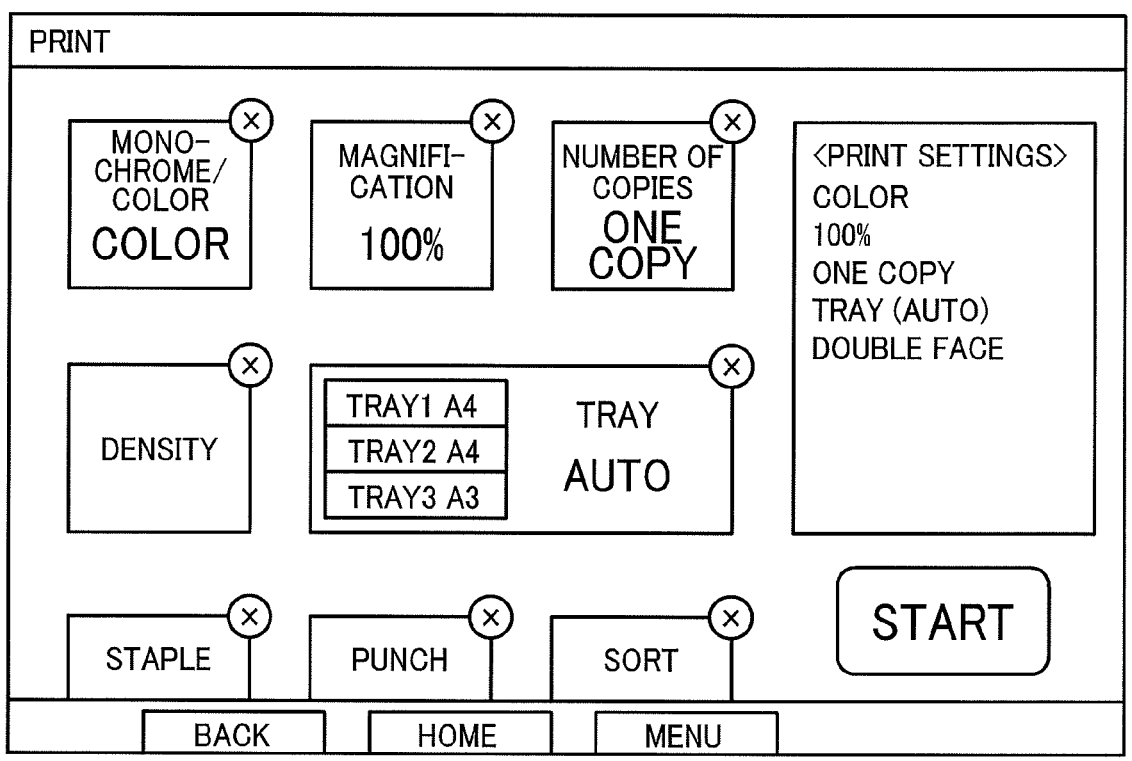
Figure 17:
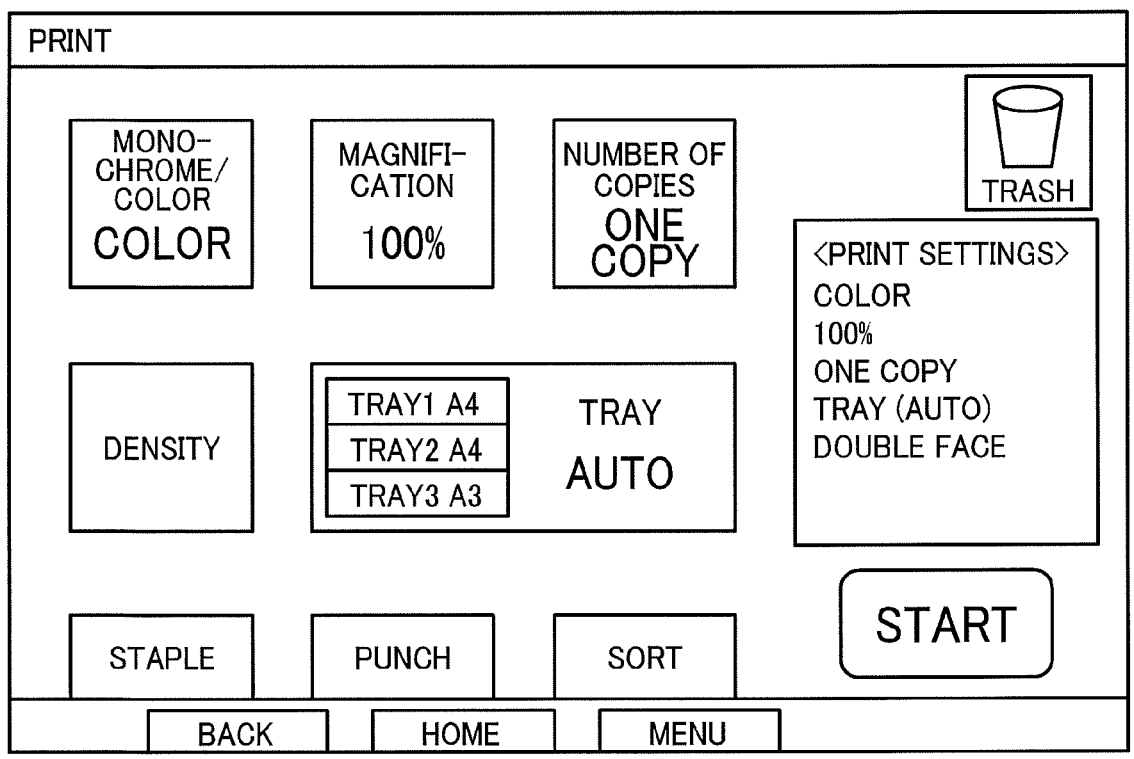
FIG. 17 illustrates another example of an application screen of a customization mode.

A description is given of an image forming apparatus 1 of a fourth embodiment with reference to FIGS. 16 and 17. The configuration of the image forming apparatus 1 of the fourth embodiment is similar to the first embodiment.

In the fourth embodiment, the display control unit 11 customizes one or more setting item buttons displayed on the application screen in response to an operation by a user, in which deleting and/or changing positions of the setting item buttons are performed. In a case of customizing the setting item buttons, the display control unit 11 changes or switches the display status of the application screen to a customization mode.

The mode can be switched to the customization mode, for example, by touching the setting item button for a longer time, by selecting a switching button for switching between a normal mode and the customization mode. In the customization mode, the setting item button displayed on the screen can be moved or shifted by a drag and drop operation. When a user moves the setting item button, the display control unit 11 updates the "position" included in the setting item information (see FIG. 8) of the setting item button that is moved to a new position after the movement or shifting.

FIG. 16 illustrates an example of an application screen of the customization mode. In an example case of FIG. 16, when a user switches a position of the color button and a position of the magnification button in the application screen as illustrated in FIGS. 16A and 16B, the display control unit 11 changes the "position" included in the setting item information of the setting item "color" from "1" to "2" (FIG. 8) and also changes the "position" included in the setting item information of the setting item "magnification" from "2" to "1" (FIG. 8).

In an example case of FIG. 16, a display-cancel button is displayed at the upper right of each setting item button as illustrated in FIG. 16C with a symbol of "x" to set the setting item button under the non-displayed status. When a user selects (e.g., presses) the display-cancel button of one setting item button, the display control unit 11 changes the "display" included in the setting item information of the setting item corresponding to the one setting item button from "Y" to "N" (see FIG. 8) to set the one setting sing button under the non-displayed status. This processing is equivalent to deleting the setting item button from the application screen.

FIG. 17 illustrates another example of an application screen of the customization mode. In an example case of FIG. 17, instead of displaying the display-cancel button (FIG. 16C), a "trash" icon is displayed, in which when a setting item button is dropped into the "trash" icon, the setting item button becomes the non-displayed status. When a user drops one setting item button into the "trash" icon, the display control unit 11 changes the "display" included in the setting item information of the setting item corresponding to the one setting item button from "Y" to "N" (see FIG. 8) to set the one setting sing button under the non-displayed status.

As to the above described fourth embodiment, the setting item button displayed on the application screen can be customized, with which usability of the image forming apparatus 1 can be improved or enhanced. Further, even when the setting item button corresponding to the error is not displayed due to the customization of the setting item button, the setting value of the setting item corresponding to the setting item button under the non-displayed status can be changed to cancel the error as similar to the first to the third embodiments.

As to the above described embodiments, even when one or more setting item buttons corresponding to respective errors are under the non-displayed status on the screen, the setting value of the one or more setting items corresponding to the respective errors can be changed by displaying one or more setting item buttons corresponding to the one or more setting items corresponding to the error.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU can be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus."

Numerous additional modifications and variations for the modules, the units, and the apparatuses are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An information processing apparatus, comprising:
    circuitry configured to
        display a setting screen including multiple setting items, each of the multiple setting items being used to change a setting value applied to information processing;
        set, based on a user operation, whether or not to display a certain setting item of the multiple setting items on the setting screen;
        detect an occurrence of an error during the information processing; and
        display the setting screen to change a setting value corresponding to a particular setting item of the multiple setting items, when the occurrence of the error is detected during the information processing and the particular setting item is set as not to be displayed on the setting screen, the particular setting item being used to resolve the error by changing the setting value corresponding to the particular setting item.

2. The information processing apparatus of claim 1, wherein the circuitry is further configured to display, on the setting screen, the particular setting item of the multiple setting items, when the occurrence of the error is detected during the information processing and the particular setting item is set as not to be displayed on the setting screen, the particular setting item being used to resolve the error by changing the setting value corresponding to the particular setting item.

3. The information processing apparatus of claim 1, wherein the circuitry is further configured to
    display, on the setting screen, a button for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and
    display the setting screen when the button is selected, the setting value corresponding to a particular setting being changed via the setting screen.

4. The information processing apparatus of claim 1, wherein the circuitry is further configured to
    display a dialog screen for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and display the setting screen when a button included in the dialog screen is selected, the setting value corresponding to a particular setting being changed via the setting screen.

5. An information processing method, comprising:

displaying a setting screen including multiple setting items, each of the multiple setting items being used to change a setting value applied to information processing;

setting, based on a user operation, whether or not to display a certain setting item of the multiple setting items on the setting screen;

detecting an occurrence of an error during the information processing; and displaying the setting screen to change a setting value corresponding to a particular setting item of the multiple setting items, when the occurrence of the error is detected during the information processing and the particular setting item is set as not to be displayed on the setting screen, the particular setting item being used to resolve the error by changing the setting value corresponding to the particular setting item.

6. The information processing method of claim 5, further comprising displaying, on the setting screen, the particular setting item of the multiple setting items, when the occurrence of the error is detected during the information processing and the particular setting item is set as not to be displayed on the setting screen, the particular setting item being used to resolve the error by changing the setting value corresponding to the particular setting item.

7. The information processing method of claim 5, further comprising:

displaying, on the setting screen, a button for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and displaying the setting screen when the button is selected, the setting value corresponding to a particular setting being changed via the setting screen.

8. The information processing method of claim 5, further comprising:

displaying a dialog screen for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and displaying the setting screen when a button included in the dialog screen is selected, the setting value corresponding to a particular setting being changed via the setting screen.

9. A non-transitory computer-readable medium storing a program that, when executed by processing circuitry, causes the processing circuitry to perform an information processing method, comprising:

displaying a setting screen including multiple setting items, each of the multiple setting items being used to change a setting value applied to information processing;

setting, based on a user operation, whether or not to display a certain setting item of the multiple setting items on the setting screen;

detecting an occurrence of an error during the information processing; and displaying the setting screen to change a setting value corresponding to a particular setting item of the multiple setting items, when the occurrence of the error is detected during the information processing and the particular setting item is set as not to be displayed on the setting screen, the particular setting item being used to resolve the error by changing the setting value corresponding to the particular setting item.

10. The computer-readable medium of claim 9, wherein the method further comprises displaying, on the setting screen, the particular setting item of the multiple setting items, when the occurrence of the error is detected during the information processing and the particular setting item is set as not to be displayed on the setting screen, the particular setting item being used to resolve the error by changing the setting value corresponding to the particular setting item.

11. The computer-readable medium of claim 9, wherein the method further comprises:

displaying, on the setting screen, a button for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and displaying the setting screen when the button is selected, the setting value corresponding to a particular setting being changed via the setting screen.

12. The computer-readable medium of claim 9, wherein method further comprises:

displaying a dialog screen for changing the setting value corresponding to the particular setting item of the multiple setting items, when the occurrence of the error is detected during the information processing and the particular setting item is set as not to be displayed on the setting screen, the particular setting item being used to resolve the error by changing the setting value corresponding to the particular setting item; and displaying the setting screen when a button included in the dialog screen is selected, the setting value corresponding to a particular setting being changed via the setting screen.

13. The information processing apparatus of claim 1, wherein the circuitry is further configured set whether or not to display the certain setting item of the multiple setting items based on the user operation, which is received via the setting screen.

14. The information processing apparatus of claim 1, wherein the circuitry is further configured to set whether or not to display the certain setting item of the multiple setting items based on the user operation, which includes selecting the certain setting item of the multiple setting items displayed on the setting screen.

15. The information processing apparatus of claim 14, wherein the circuitry is further configured to change the setting value corresponding to the certain setting item of the multiple setting items selected by the user operation.

* * * * *